US008943106B2

(12) United States Patent
Labbi et al.

(10) Patent No.: US 8,943,106 B2
(45) Date of Patent: Jan. 27, 2015

(54) MATRIX RE-ORDERING AND VISUALIZATION IN THE PRESENCE OF DATA HIERARCHIES

(75) Inventors: Abderrahim Labbi, Zurich (CH); Michail Vlachos, Rueschlikon (CH); Christos Boutsidis, Troy, NY (US)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 12/751,196

(22) Filed: Mar. 31, 2010

(65) Prior Publication Data

US 2011/0246537 A1    Oct. 6, 2011

(51) Int. Cl.
G06F 17/30  (2006.01)
(52) U.S. Cl.
CPC ............................. *G06F 17/30994* (2013.01)
USPC ..................................................... 707/805
(58) Field of Classification Search
USPC ...................................................... 707/805
See application file for complete search history.

(56) References Cited

U.S. PATENT DOCUMENTS

| 7,110,609 | B2 | 9/2006 | Malvar |
|---|---|---|---|
| 2007/0192350 | A1* | 8/2007 | Gao et al. ...................... 707/102 |
| 2007/0294038 | A1 | 12/2007 | Landau et al. |
| 2008/0071843 | A1 | 3/2008 | Papadimitriou et al. |

FOREIGN PATENT DOCUMENTS

WO    2008154029 A1    12/2008

OTHER PUBLICATIONS

Optimal Arrangement of Leaves in the Tree Representing Hierarchical Clustering of Gene Expression Data, [online]; [retrieved on Mar. 30, 2010]; retrieved from the Internet http://www.nslij-genetics.org/microarray/biedl_pre.pdf.
Rearrangement Clustering: Pitfalls, Remedies, and Applications, [online]; [retrieved on Mar. 30, 2010]; retrieved from the Internet http://jmlr.csail.mit.edu/papers/volume7/climer06a/climer06a.pdf.
MatrixExplorer: a Dual-Representation System to Explore Social Networks, [online]; [retrieved on Mar. 30, 2010]; retrieved from the Internet http://citeseerx.ist.psu.edu/viewdoc/download?doi=10.1.1.104.1055&rep=rep1&type=pdf.
Compressing Large Boolean Matrices Using Reordering Techniques, [online]; [retrieved on Mar. 30, 2010]; retrieved from the Internet http://www.cs.toronto.edu/vldb04/protected/eProceedings/contents/pdf/RS1P1.PDF.
Periodic Reordering of Complex Networks, [online]; [retrieved on Mar. 30, 2010]; retrieved from the Internet http://www.ifr.ac.uk/netsci08/Download/CT_Abstracts/CT235.pdf.

(Continued)

*Primary Examiner* — Huawen Peng
(74) *Attorney, Agent, or Firm* — Cantor Colburn LLP; Daniel Morris

(57) ABSTRACT

Exemplary embodiments include a method for re-ordering and visualizing a matrix in the presence of a data hierarchy stored on a computer system, the method including receiving a matrix, in the computer system, the matrix having rows and columns, reordering the matrix so that groups of related rows and columns are brought in adjacent matrix positions, wherein reordering the matrix A obeys constraints imposed by the data hierarchy on at least one of the rows and the columns and reordering the hierarchy on at least one of the rows and columns, wherein affinities in the data hierarchy are extracted by the reordering of the data hierarchy.

24 Claims, 11 Drawing Sheets

(56) References Cited

OTHER PUBLICATIONS

Sparse Matrix Reordering Algorithms for Cluster Identification, [online]; [retrieved on Mar. 30, 2010]; retrieved from the Internet http://osl.iu.edu/~chemuell/projects/bioinf/sparse-matrix-clustering-chris-mueller.pdf.

Vertex Reordering Algorithms for Cluster Identification, [online]; [retrieved on Mar. 30, 2010]; retrieved from the Internet http://osl.iu.edu/~chemuell/projects/bioinf/graph-clustering-chris-mueller.pdf.

* cited by examiner

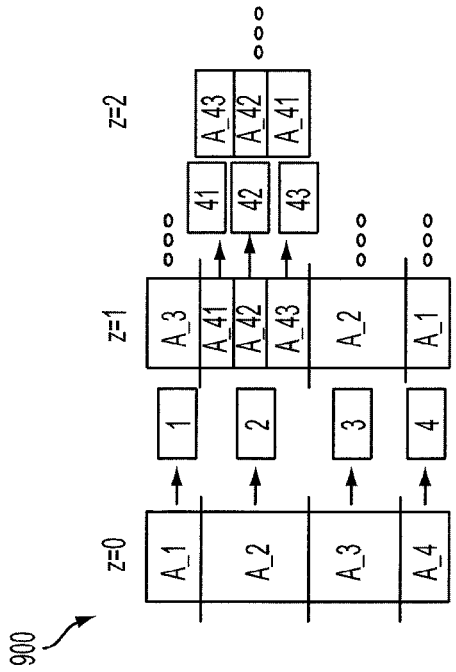
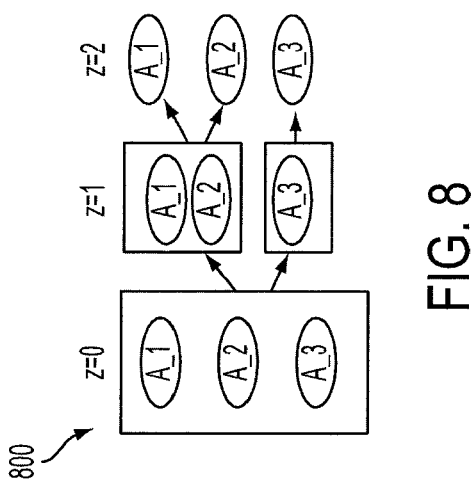
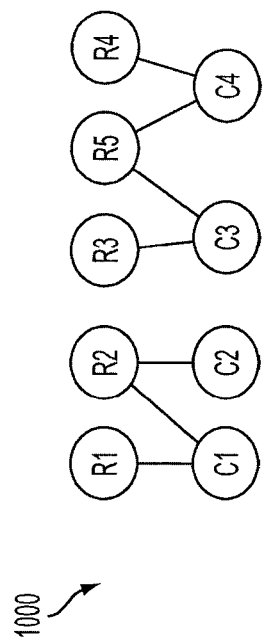
FIG. 9
FIG. 8
FIG. 10

MATRIX RE-ORDERING AND VISUALIZATION IN THE PRESENCE OF DATA HIERARCHIES

BACKGROUND

The present invention relates to computer system and method data processing, and more specifically, to systems, methods and computer program products for describing the connection between dyadic observations such as customer-products, documents-terms, genes-diseases, and so on, while exploiting the presence of pre-existing hierarchies.

Customer-product interaction data can be represented in a matrix, indicating which customers (rows) have bought which products (columns). Such historical data can be utilized to drive the new sales efforts and marketing campaigns. One of the common analytic processes in such a task is typically the identification of groups of customers (row sub-matrix) that buy (or don't buy) a subset of the available products (column sub-matrix), which can assist in organizing focused marketing campaigns or events. The customer-product matrix data can be processed in a computer system. The processing of the data maps to a matrix reordering with concurrent hierarchy reordering problem.

SUMMARY

Exemplary embodiments include a method for re-ordering and visualizing a matrix in the presence of a data hierarchy stored on a computer system, the method including receiving a matrix, A, in the computer system, the matrix A having rows and columns, reordering the matrix A so that groups of related rows and columns are brought in adjacent matrix positions, wherein reordering the matrix A obeys constraints imposed by the data hierarchy on at least one of the rows and the columns and reordering the hierarchy on at least one of the rows and columns, wherein affinities in the data hierarchy are extracted by the reordering of the data hierarchy.

Additional exemplary embodiments include a computer program product for re-ordering and visualizing a matrix in the presence of data hierarchies stored on a computer system, the computer program product including instructions for causing the computer system to implement a method, the method including receiving a matrix, A, in the computer system, the matrix A having rows and columns, generating a bipartite graph for matrix A, computing an adjacency matrix B for the matrix A, computing a Laplacian matrix, D, from the adjacency matrix B, computing a Fielder vector from the Laplacian matrix D, reordering the columns of the matrix A and reordering the rows of the matrix A.

Additional exemplary embodiments include a method for re-ordering and visualizing a matrix in the presence of data hierarchies stored on a computer system, the method including receiving a first data set, receiving a second data set, generating a sparse matrix A representing a data hierarchy including the first and second data sets and reordering the sparse matrix A to reveal interactions between the first and second data sets to generate a re-ordered hierarchy.

Further exemplary embodiments include a computer program product for re-ordering and visualizing a matrix in the presence of data hierarchies stored on a computer system, the computer program product including instructions for causing the computer system to implement a method, the method including receiving a first data set, receiving a second data set, generating a sparse matrix A representing a data hierarchy including the first and second data sets and reordering the sparse matrix A to reveal interactions between the first and second data sets to generate a re-ordered hierarchy.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 8 illustrates an example of a 2-level hierarchical structure in accordance with exemplary embodiments.

FIG. 9 illustrates an exemplary visual representation of a re-ordering algorithm in accordance with exemplary embodiments.

FIG. 10 illustrates an example of a bipartite graph in accordance with exemplary embodiments.

DETAILED DESCRIPTION

Figure 2:
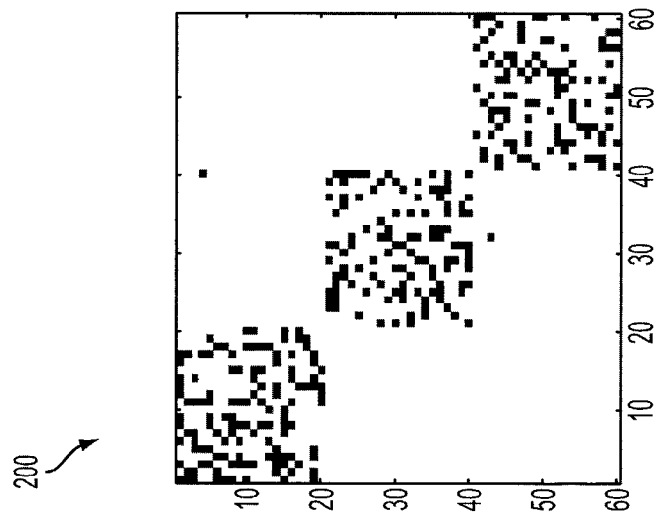
FIG. 2 illustrates an example of a plot of data of products versus customers after reshuffling the rows and columns in accordance with exemplary embodiments.

In exemplary embodiments, the systems and methods described herein reorder matrices in the presence of a data hierarchy. In addition, the systems and methods described herein reorders the hierarchies associated with the matrices. In exemplary embodiments, the matrices are reordered under constraints imposed by the hierarchies and therefore the matrices obey the constraints of the hierarchies. In addition, the reordering of the matrix is constrained by the hierarchy and also propagates to the hierarchy. Finally, the systems and methods described herein provide visualization of the reordered matrices and hierarchies. The systems and methods described herein provide a reordering on the matrix and hierarchy, which elucidates the connections between the dyadic observations and the connections between the existing hierarchy on the rows and or columns of a matrix A. The systems and methods described herein describe connections between dyadic observations such as customer-products, documents-terms, and genes-diseases, while exploiting the presence of pre-existing hierarchies. The systems and methods described herein also provide a rearrangement of rows and columns of the matrix that suggest homogeneous groups and a rearrangement of the hierarchies that indicate the affinity between the hierarchies. For illustrative purposes, the systems and methods described herein are described within the setting of customer-product dyadic observations. However, it will be appreciated that the systems and methods described herein are applicable to various other fields.

In exemplary embodiments, the systems and methods described herein reorder data represented in a matrix in a row and column format in order to compact the reordered matrix. In data applications, such as business applications involving customer product interaction data, the data can be sparse and inherently contain a hierarchical structure, which can cause a hierarchical sparse matrix reordering problem. In a sparse data matrix, A, and a hierarchical structure on, for example, the rows of A, the hierarchical sparse matrix reordering problem is the combinatorial optimization problem of reordering the rows and the columns of A in such a way that the reordered matrix is as "compact" as possible. In addition, the reordering of the rows should not violate the hierarchical constraints. The systems and methods described herein include a reordering algorithm for matrices with existing hierarchies. In exemplary embodiments, the algorithm implements properties of a Fiedler vector of a bipartite graph with nodes the rows and the columns of the sparse matrix A. The exemplary algorithm reorders not only the rows but also row sub-matrices of the input matrix, allows for the exploration of connections in the data in all levels of the existing hierarchy. The systems and methods described herein can be implemented on a large aggregation of real customer-product interaction data. The algorithm can also be implemented in a variety of other applications including but not limited to real sales and marketing.

In exemplary embodiments, the systems and methods described herein incorporate hierarchies into the matrix reordering problem, and enforce constraints that obey a hierarchical structure. Hierarchies appear in many customer-product interaction data and the exemplary embodiments described herein discover connections between hierarchies of different entities. For example, a company (entity A) has customers (entity B). Entity A may have a hierarchy of products (e.g., hardware, software, services) and Entity B can have pre-existing hierarchies of products (e.g., automotive, computer, telco). The systems and methods described herein find the connections at multiple resolutions of the customers and products as well as pre-existing hierarchies (e.g., financial services and banks are related and both purchase specific groups of products). It is appreciated that hierarchies exist in a large variety of problems. For example, genes can belong to one hierarchy and diseases in another hierarchy and diseases can have a higher level connection based on a medical classification. The systems and methods described herein resolve connections at both higher and lower levels of hierarchies. It is appreciated that the exemplary embodiments described herein can be applied to a large variety of problems. In exemplary embodiments, the systems and methods described herein implement a visualization level (i.e., a card deck view) that provides visualization on various hierarchical levels and interconnections between hierarchical levels (i.e., re-ordering and re-grouping the hierarchical levels).

Figure 1:
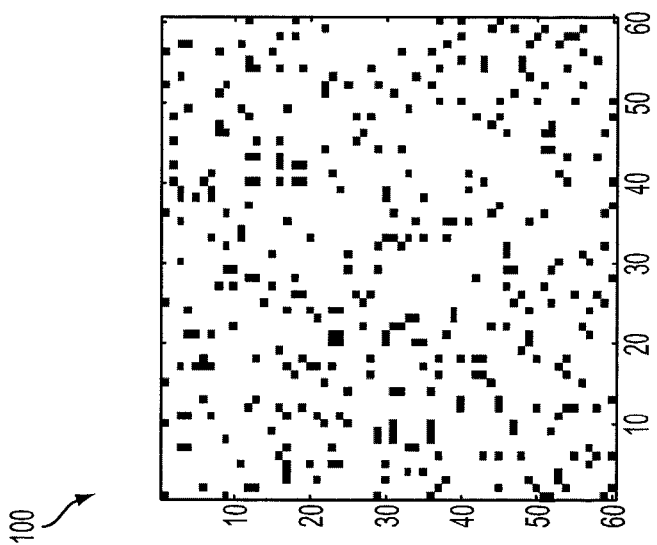
FIG. 1 illustrates an example of a plot of data of products versus customers.

FIG. 1 illustrates an example of a data plot 100 of products versus customers. The data related to the products and customers can reside in a database, which can be represented as a two dimensional array where the rows represent customers and columns the products. A position in the array contains 1 if the customer buys that product, or a 0 otherwise. In the example, there are 60 products and 60 customers.

Figures 3, 4:
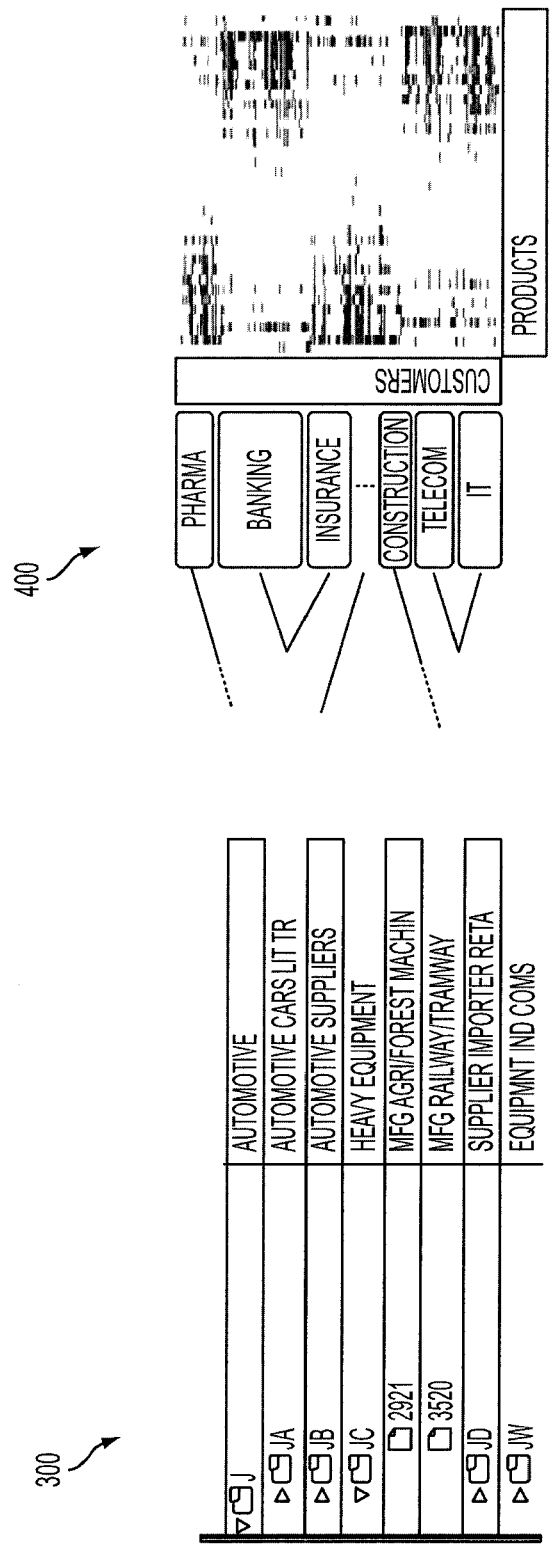
FIG. 3 illustrates an example of a portion of a hierarchy of customers.
FIG. 4 illustrates an example of a re-ordered plot of customers versus customers illustrating hierarchies within a re-ordered matrix.

FIG. 2 illustrates an example of a data plot 200 of products versus customers after reshuffling the rows and columns in accordance with exemplary embodiments. After reshuffling there are three groups of customers that buy certain groups of products. There can also be a hierarchy on the customers. For example, customers can belong to industries and sub-industries within a corporation. FIG. 3 illustrates an example of a portion of a hierarchy 300 of customers.

In exemplary embodiments, the underlying matrix associated with the customers and products can be re-ordered (re-shuffled) without mixing customers of different industries or sub-industries. It is desirable to perform a market segmentation within specific sub-industries.

In exemplary embodiments, on a top-level, customers can be first categorized into groups of different Industries, such as "Automotive" and "Health", and then, further sub-divided into sub-industries; for example "Automotive/Suppliers", "Automotive/Heavy Equipment", or "Health/Physicians", and "Health/Hospitals", for example.

In exemplary embodiments, the incorporation of hierarchies in the matrix reordering process can improve the clustering process. The reordering of the customer-product interaction matrix can generally be dominated by strong or noisy patterns, forcing the creation of erroneous re-orderings. Therefore, the incorporation of constraints in terms of hierarchies, not only allows for a natural reordering of the customers and the products, but can also deter the formation of unnatural clusters through the enforcement of data segregation. In exemplary embodiments, the systems and method described herein therefore avoid performing a market analysis on segment of customers belonging on different parts of the hierarchy. The systems and methods described herein further provide enhanced data exploration and easier visualization of customer-product patterns. The incorporation of hierarchies enhances the exploratory power of the analytic process, since the user can interact with an existing and known hierarchy. In addition, the incorporation of hierarchies enables implementations of the matrix re-orderings, since subsets of objects are considered in the algorithm execution, which can enable parallelization of the analytic processes described herein.

FIG. 4 illustrates an example of a re-ordered plot 400 of customers versus customers illustrating hierarchies within a re-ordered matrix. In exemplary embodiments, both the matrix and the hierarchy are re-ordered to discover meaningful clusters in both the matrix and the pre-existing hierarchy. The systems and methods described herein consider the existence of hierarchies and present an interactive plot for data exploration.

Given a matrix of interrelated elements (e.g. customers-products, patients-diseases, genes-proteins) and given a given hierarchy on any of the two dimensions, the systems and methods described herein can discover the interactions between the entities/dimensions, and also discover the connections within the hierarchy. In exemplary embodiments, the systems and methods described herein "re-shuffle" the matrix (i.e., rows and columns) in such a way so that: a) Dense areas of the array are uncovered, which indicates for example, groups of customers that buy the same products in a business setting, or groups of diseases that are connected using medical data; b) The reordering obeys the pre-existing hierarchies (e.g., no customers that belong to different industries are reordered to be adjacent, since it is not meaningful to mix buying patterns from people belonging to different industries); c) The hierarchy itself will be reordered, which brings closer branches of the hierarchy that are 'similar' (i.e. that share similar buying patterns, thereby enabling discovery of commonalities and connections between groups in the hierarchy (e.g., products and customers); d) Data exploration can be done in an interactive manner, which allows exploration of the interaction matrix in a hierarchical manner.

The examples presented herein are in a setting of customer-product interaction data. As described herein, the exemplary embodiments can be applied in various applications including, but not limited to: a) Medical data (e.g. Patient-Disease matrix (i.e., to discover common diseases), gene-protein interaction data; b) Web data, (e.g., World Wide Web uniform resource locators (URLs) versus Content; which are the URLs that cluster together given a hierarchy of web URLs.

Figure 5:
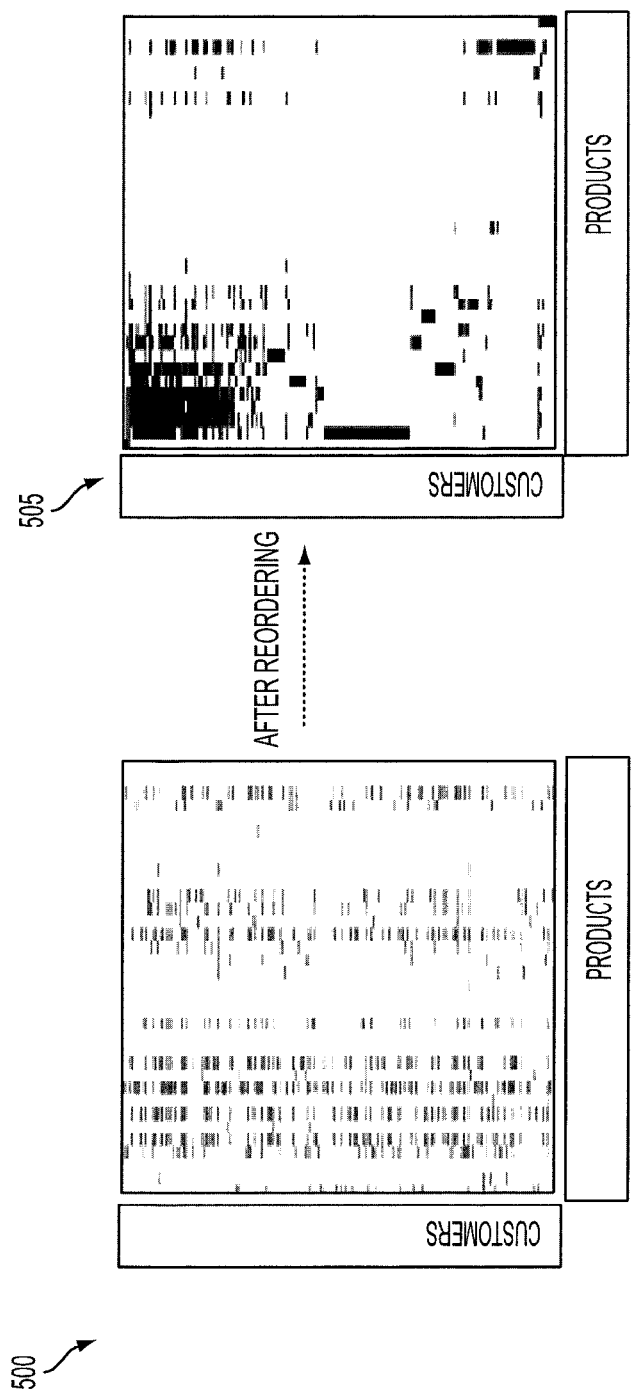
FIG. 5 illustrates examples of data plots before and after reordering in accordance with exemplary embodiments.

The exemplary systems and methods described herein re-order rows/columns of the matrix to reveal hidden clusters. The reordering obeys any existing hierarchies (e.g., rows and columns). In addition, the hierarchy itself is reordered so that 'similar' branches are brought together. FIG. 5 illustrates examples of data plots 500, 505 before and after reordering in accordance with exemplary embodiments. The final plot 505 enables additional knowledge discovery on pre-existing hierarchies. In exemplary embodiments, on a usability level, a user can interact with pre-existing hierarchies lending to a more intuitive data exploration.

Figure 6:
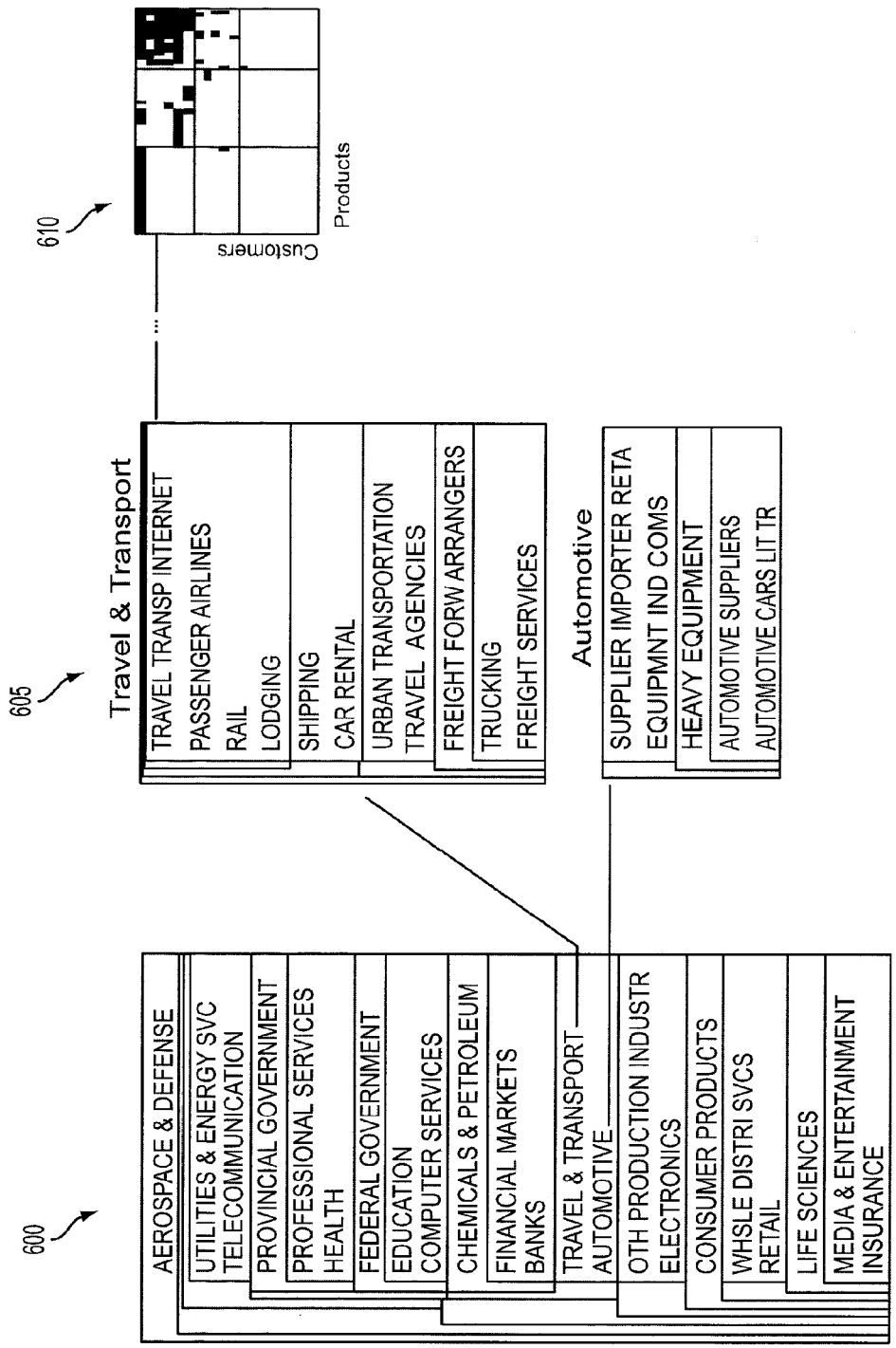
FIG. 6 illustrates an example of hierarchies in accordance with exemplary embodiments.
Figure 7:
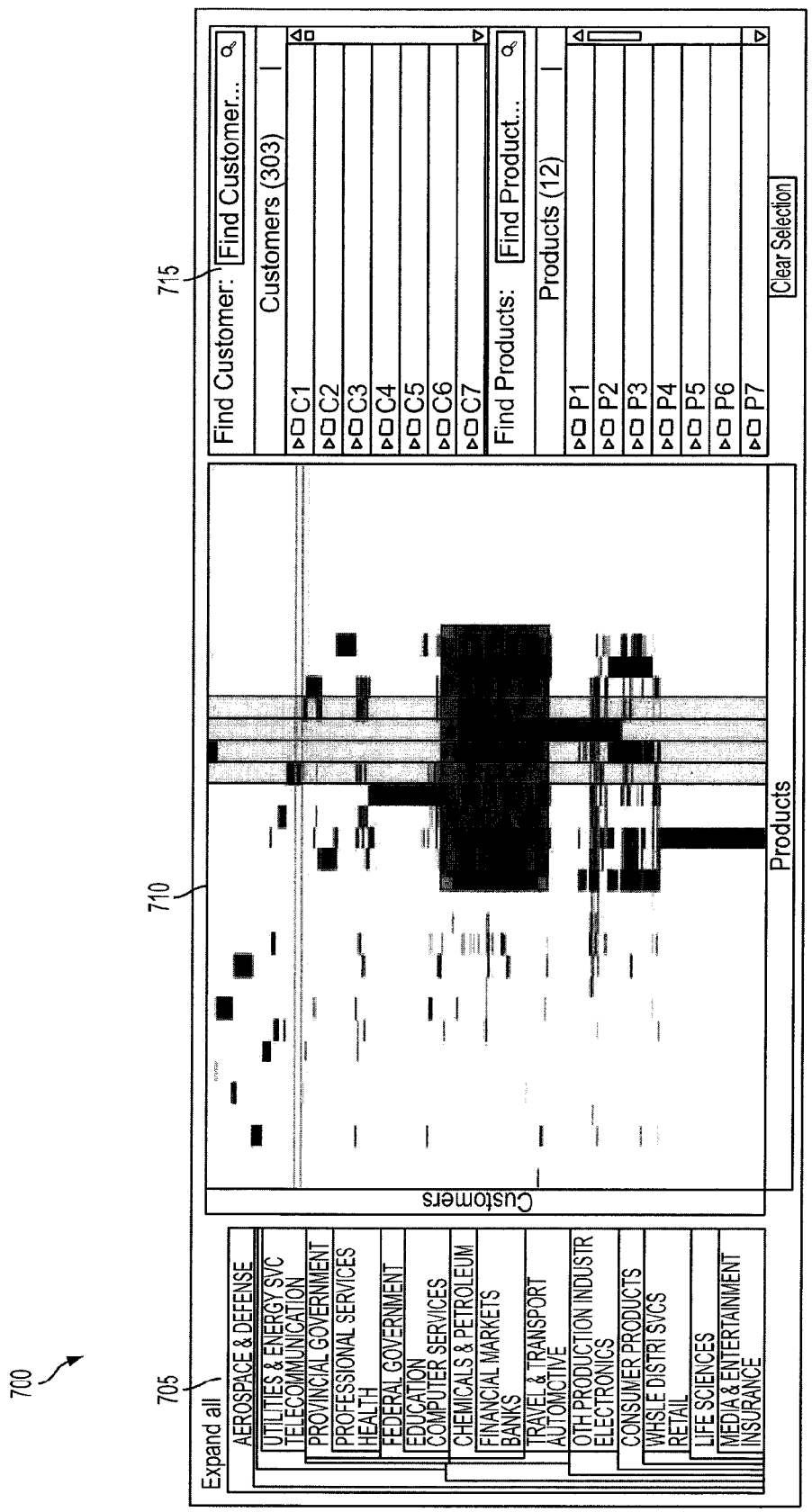
FIG. 7 illustrates a screenshot of a customer-product hierarchy, data plot and text view in accordance with exemplary embodiments.

FIG. 6 illustrates an example of hierarchies 600, 605, 610 in accordance with exemplary embodiments. The hierarchy 600 illustrates a re-ordered hierarchy in accordance with exemplary embodiments. In this example, travel & transport and automotive are grouped and brought adjacent, because customers from these two industries buy similar products which is given as result of exemplary algorithms described herein. The hierarchy 605 is a re-ordered hierarchy for the selected branch of the re-ordered hierarchy 600 and the hierarchy 620 is a re-ordered hierarchy for the selected branch of the re-ordered hierarchy 600. In exemplary embodiments, the systems and methods described herein enable visualization of portions of the customer-product matrices and show the discovered clusters. FIG. 7 illustrates a screenshot 700 of a customer-product hierarchy 705, data plot 710 and text view 715 in accordance with exemplary embodiments. The screenshot 700 illustrates an example of an interface in which a user can interact with the hierarchy to explore matrices, sub-matrices and discover clusters.

In exemplary embodiments, the systems and methods described herein evaluate the compactness of the customer-product matrix, which addresses mathematical optimization issues associated with the incorporation of pre-existing hierarchies in the matrix reordering algorithms. The "compactness" of a matrix measures the space that is needed to store the matrix in computer system storage (e.g., the hard disk), which is low when the matrix contains dense regions of non-zero entries rather than when the non-zeros are spread randomly in the matrix. For a run length encoding (RLE) representation, given an m×n matrix A, RLE representation of A includes a vector g that is constructed as now described. The matrix A is first transformed to a vector given by $r \in R^{mn}$ by putting the columns of A one after the other. For every sequence of identical elements in r, the next two empty elements of the vector g are filled with the number of occurrences of the corresponding element and the element itself. The vectors r and g that correspond, for example, to the following matrix:

$$A = \begin{pmatrix} 1 & 1 & 0 \\ 0 & 1 & 0 \\ 0 & 1 & 1 \end{pmatrix}$$

are given by:

$$r = (000111000)^T$$

$$g = (0120312010)^T$$

As described above, the systems and methods described herein evaluate the compactness of the customer-product matrix. For the matrix A, compactness if defined as $\min(C_A, C_A^T)$, where $C_A$ and $C_A^T$ are the number of bytes needed to store the RLE representation vectors $g_A$ and $g_A^T$ of A and $A^T$, respectively. In addition, for the matrix A, a row hierarchical structure, H, is preserved if there is a t-level bottom up hierarchical partitioning of the rows of A. Furthermore, z is an index for the levels of H, with $0 \leq z \leq t$. The $0^{th}$ level of H is a group of all the rows of A. In the first level of H (z=1), the rows of A are divided into some groups, in the second level of H (z=2) every group of the first level is divided into some sub-groups in the last level of H (z=t) all the groups of the z=(t−1)-th level are divided into more sub-groups. Considering, for example, the above matrix A with three rows denoted as $A_1, A_2$, and $A_3$, respectively, FIG. 8 represents a t=2-level hierarchical structure H 800. As described herein, the hierarchical sparse matrix re-ordering problem, given the sparse matrix, $A \in R^{m \times n}$ and a row hierarchical structure H, construct a reordered matrix $\tilde{A}_{opt}$ such that $\tilde{A}_{opt}$ preserves A., and the compactness C of $\tilde{A}_{opt}$ is minimized among the reordered matrices $\tilde{A}$ that preserve H.

In exemplary embodiments, the systems and methods described herein implement algorithms that start from the 0-th level of H and reorder the row sub-matrices corresponding to this level. A representative vector is extracted from every row-sub-matrix of a current level of the hierarchy; then, a standard algorithm for reordering vectors is applied on the representatives. The above process is repeated for all t levels of H. FIG. 9 illustrates an exemplary visual representation 900 of a re-ordering algorithm in accordance with exemplary embodiments. $A_1$ to $A_4$ denote row sub-matrices of the input matrix A. First, the algorithm extracts a representative vector for every such sub-matrix. These representative vectors are denoted as $rep_1, \ldots, rep_4$, respectively. An exemplary algorithm employs values of a Fiedler vector in order to form the representative vectors. Then, a standard reordering algorithm is applied on the vectors $rep_1, \ldots, rep_4$. The exemplary algorithm reorders the representative vectors by sorting the corresponding values; this choice is based on the properties of the Fiedler as described herein. The same process is continued for all levels of H. After the process is repeated, the entities are re-ordered in all different levels of H.

In exemplary embodiments, given the sparse matrix $A \in R^{m \times n}$ with m rows and n columns, an undirected bipartite graph $G=(V_r, V_c, E)$ can be defined with m+n nodes. $V_r$ and $V_c$ can include m and n nodes corresponding to the rows and the columns of A, respectively. E is the set of edges of G; an edge $e_{ij}$ is present in E if and only if $A_{ij}=1$. The cardinality of the edges of G equals the number of the non-zero elements in A. The following is an example of a 5×4 matrix A corresponding to the bipartite graph G as illustrated in FIG. 10 (illustrating an example of a bipartite graph 1000):

$$A = \begin{pmatrix} 1 & 0 & 0 & 0 \\ 1 & 1 & 0 & 0 \\ 0 & 0 & 0 & 1 \\ 0 & 0 & 1 & 1 \end{pmatrix}$$

In exemplary embodiments, the nodes Vr={R1, R2, R3, R4, R5} correspond to the rows of A and the nodes Vc={C1, C2, C3, C4} to the columns of A. An edge is connecting a node from Vr to a node from Vc if and only if the corresponding element in A is non-zero. The adjacency matrix of G is:

$$B = \begin{pmatrix} 0 & A \\ A^T & 0 \end{pmatrix} \in R^{(m+n) \times (m+n)}$$

In the above definition of B, the first m nodes of G (rows in B) correspond to the rows of A, and similarly for columns. The Laplacian matrix of G is defined as L=D−B, where:

$$D = \begin{pmatrix} D_1 & 0 \\ 0 & D_2 \end{pmatrix} \in R^{(m+n) \times (m+n)}$$

where $D_1 \in R^{m \times m}$ and $D_2 \in R^{m \times n}$ are diagonal matrices with $D_1(ii)=\Sigma_j A(ij)$ and $D_2(jj)=\Sigma_i A(ij)$, respectively. In exemplary embodiments, the Fielder vector can be implemented in the reordering the sparse matrix A. The Fiedler vector $f \in R^{m+n}$ of the bipartite graph G is defined as the eigenvector of the Laplacian matrix L that corresponds to the second smallest eigenvalue of L. In exemplary embodiments, a way to compute the vector f in terms of the singular vectors of a normalized version of the matrix A can be given as:

$$f = \begin{pmatrix} u_2 \\ v_2 \end{pmatrix} \in R^{m+n}$$

where $u_2 \in R^m$ and $v_2 \in R^n$ are the left and right singular vectors of the matrix:

$$\Gamma = D_1^{-1/2} A D_2^{-1/2} \in R^{m \times n}$$

that correspond to the second largest singular value of $\Gamma$, respectively.

The Fiedler vector of G can be implemented to embedding a graph in the line (i.e., every node of the graph corresponds to an element in the Fiedler vector), such that "similar" nodes are close to each other in the embedding. In exemplary embodiments, the similarity measured by the Fiedler vector depicts the notion of putting two rows or columns close to each other if and only if they transform the sparse matrix A into a "compact" block diagonal matrix. If x(i) and x(j) denote the location of the i-th and j-th nodes of G in the embedding, respectively, then embedding the vector $x \in R^{m+n}$ is the solution of the following optimization problem:

$$\min_x F(x) = \Sigma_{e_{ij} \in E}(x(i)-x(j))^2$$

In theory, the optimal such x would correspond to an embedding (equivalently reordering) of the nodes of G such that nodes connected with an edge are close to each other. The above problem has infinite many solutions. In exemplary embodiments, to overcome the infinite solutions, the average value of x can be equal to zero, (i.e. the constraint $x^T e=0$, where e is the (m+n)-dimensional vector of all vectors). With the additional constraint, the vector x=0 is a trivial solution of the above optimization problem. To avoid the trivial problem, another constraint is added by setting x to be of unit length. As such, the optimization problem can be stated as follows:

$$\min_{x, x^T=0, xTx=1} F(x) = \Sigma_{e_{ij} \in E}(x(i)-x(j))^2$$

Recalling the definition of the Laplacian matrix of G given above, the above objective function is equivalent with $F(x)=x^T L x$, which can be the Raleigh quotient of the matrix L. Standard linear algebra arguments now imply that the factor $x^T L x$ is minimized by the eigenvector of L corresponding to the smallest eigenvalue of L, but this value is excluded from the solution because it violates the constraint $x^T e=0$, since the smallest eigenvector of L is the vector e (assuming that G is connected). Thus the solution of the above optimization problem is the eigenvector corresponding to the second smallest eigenvalue of the Laplacian matrix L. The Fiedler vector corresponding to the graph G of the matrix A defined above is the following:

$$f = \begin{pmatrix} u_2 \\ v_2 \end{pmatrix} = \begin{pmatrix} -0.4920 \\ -0.4920 \\ +0.0796 \\ +0.0796 \\ +0.0796 \\ -0.4920 \\ -0.4920 \\ +0.0796 \\ +0.0796 \end{pmatrix}$$

The first five elements of f correspond to the rows of A while the last four elements of f correspond to the columns of A. Reordering the rows and the columns of A by using the values of the elements of the Fiedler vector results in a matrix which is "close" to a matrix of block-diagonal form. In this example, the reordered matrix would be equal to A since A is already a block diagonal matrix; but since the Eigenvalue Decomposition of A does change for any column/row permutations of A, the same embedding for any matrix that is equivalent with A under row/column permutations results.

Figure 11:
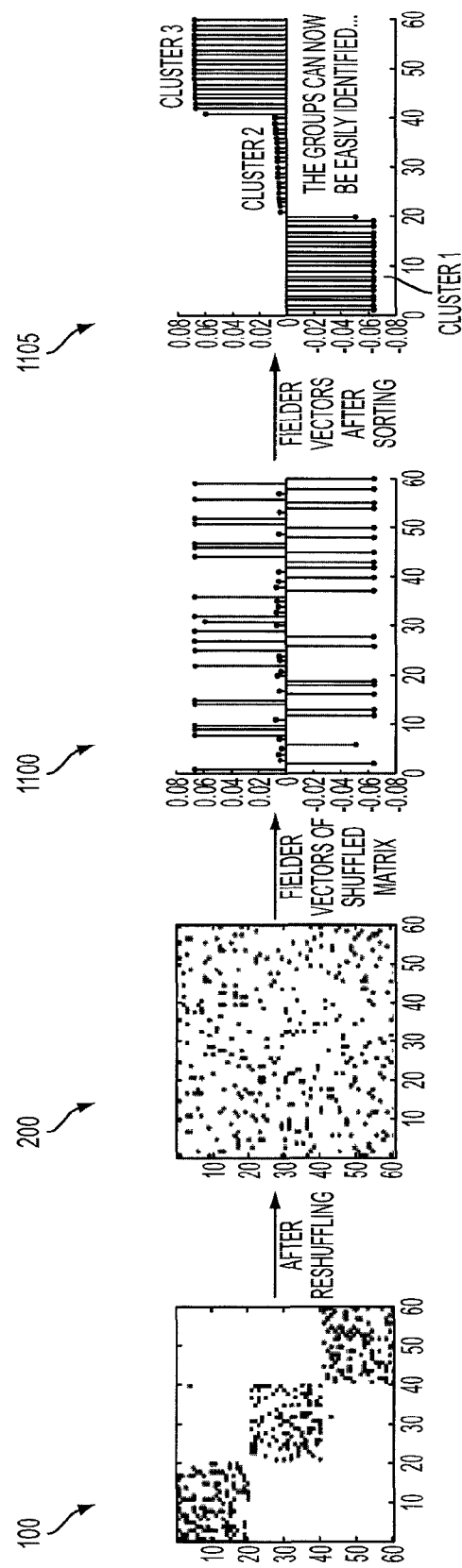
FIG. 11 illustrates examples of data plots illustrating properties of a Fielder vector in accordance with exemplary embodiments.

Another example illustrating the properties of the Fiedler vector is shown in FIG. 11. In this example, a block diagonal matrix A with size 60×60 is constructed, where each one of the three blocks is of size 20×20. The columns and the rows of A are then randomly permuted to construct a shuffled matrix $A_s$. After the random permutation step, the Fiedler vector of the bipartite graph is computed, which corresponds to the matrix $A_s$. FIG. 11 includes the examples of the data plots 100, 200 of FIGS. 1 and 2, respectively. The third data plot 1100 in FIG. 11 shows the values of the vector $u_{2\epsilon} R^{60}$ corresponding to the rows of $A_s$. The fourth data plot 1105 of FIG. 11 depicts the values of $u_2$ sorted in increasing order. The sorted values of $u_2$ correspond to the three blocks of A. The same behavior for the values of the vector $v_2$ corresponding to the columns of $A_s$ is observed. Thus reordering the rows and the columns of the shuffled matrix according to the values of $u_2$ and $v_2$ results back the matrix A. FIG. 11 is illustrative of implementing the Fiedler vector for reordering sparse matrices into matrices of nearly block-diagonal form.

As described herein, the exemplary systems and methods implement algorithms to approximate solutions to the hierarchical sparse matrix reordering problem. The exemplary algorithms described herein employ the Fiedler vector of the bipartite graph that corresponds to the sparse matrix A. The exemplary algorithms involve the process of extracting representatives for the row sub-matrices of the current level of the hierarchy. Based on the properties of the Fiedler vector, the representative of a row sub-matrix of the current level of H is the average value of the entries of the Fiedler vector that correspond to the rows of this sub-matrix. The algorithms then take average values for representatives since the Euclidian distance of the values in the embedding is the property of the Fiedler vector that is useful for reordering the rows and the columns of A. Taking average values and sorting them via methods for sorting groups of real numbers.

The exemplary algorithm takes as inputs the sparse matrix A and the hierarchy H, and returns the matrix A~ that equals A up to row and column permutations. In the algorithm, G=(Vr; Vc; E) is the bipartite graph corresponding to the rows and the columns of A. The algorithm then computes the adjacency and the Laplacian matrices of G. The Algorithm then computes the Fiedler Vector f of G, i.e. the eigenvector that corresponds to the second smallest eigenvalue of the Laplacian matrix B of G. In exemplary embodiments, the computation of the second largest left and right singular vectors of an m×n matrix are computed. The algorithm then determines a reordering of the columns of A by sorting the last n elements of the Fiedler vector. Finally, the first m elements of f guides the reordering of the rows of A. Starting from the first level of H, and following a bottom-up approach, the groups of the current level of H (that belong to the same group on the previous level of H) are re-ordered by sorting the mean values of the elements of the Fiedler vector that correspond to the rows of these groups. When z=t, the representatives of the current level are the rows themselves.

Figure 12:
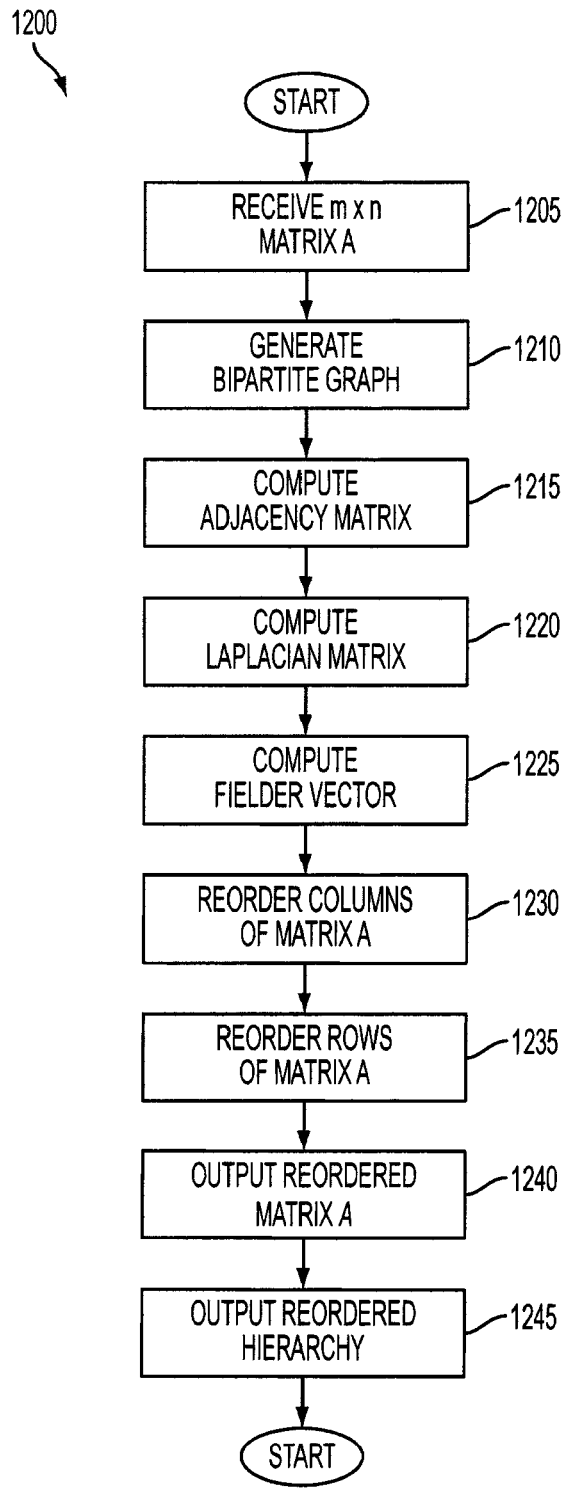
FIG. 12 illustrates a flow chart for a method for matrix re-ordering and visualization in the presence of data hierarchies in accordance with exemplary embodiments.

FIG. 12 illustrates a flow chart for a method 1200 for matrix re-ordering and visualization in the presence of data hierarchies in accordance with exemplary embodiments. At block 1205 a computer system can receive an m×n matrix A, having a row hierarchy H. As described herein, the output is a m×n reordered matrix Ã. A bipartite graph G=(Vr; Vc; E) is generated at block 1210. At block 1215, an adjacency matrix given by:

$$B = \begin{pmatrix} 0 & A \\ A^T & 0 \end{pmatrix} \in R^{(m+n) \times (m+n)}$$

is computed. At block 1220, a Laplacian matrix, given by:

$$D = \begin{pmatrix} D_1 & 0 \\ 0 & D_2 \end{pmatrix} \in R^{(m+n) \times (m+n)}$$

is computed, where $D_1 \in R^{m \times m}$ and $D_2 \in R^{n \times n}$ are diagonal matrices with $D_1(ii)=\Sigma_j A(ij)$ and $D_2(jj)=\Sigma_i A(ij)$, respectively. At block 1225, a Fiedler vector f of G is computed, where $f \in R^{(m+n)}$. In addition, the second largest left of $u_2 \in R^m$ and right $v_2 \in R^n$ vectors of $\Gamma = D_1^{-1/2} A D_2^{-1/2} \in R^{m \times n}$. In addition, f is set as follows:

$$f = \begin{pmatrix} u_2 \\ v_2 \end{pmatrix} \in R^{m+n}$$

At block 1230, the columns of the matrix A are re-ordered by sorting the values of $_2$. At block 1235, the rows are reordered, by setting z=1. The exemplary method 1200, then computes as follows:

```
While z < (t + 1) DO:
    Find all the partitions (groups) of the (z –
    1)-th level of H. Assume that the (z−1)-th
    level has |z − 1| groups.
    FOR j = 1 : jz i 1j DO
        Find all the sub-groups of the j-th
        group of the (z i 1)-th level.
        For every such sub-group compute a
        representative number, which is the
        mean value of the elements of u2 that
        correspond to the rows of this subgroup.
        Determine a reordering of the subgroups
        by sorting the representatives.
    END
    Set z = z + 1.
```

At block 1240, the computer system outputs the re-ordered matrix Ã. In addition, at block 1245, the computer system outputs the re-ordered hierarchy associated with the reordered matrix Ã. As described herein, the re-ordering of the matrix A propagates to the re-ordered hierarchy. In addition, as described herein, the matrix A obeys the constraints of the hierarchy in the re-ordering.

The computational complexity of the exemplary algorithms described herein is dominated by the computation of the Fiedler vector f of G, which takes O(min {m,n} mn) time for any m×n matrix A. If the matrix is sparse, the computation of the Fiedler vector implements time O(nnz(A)), where nnz(A) denotes the number of the nonzero elements of A. The computations of the subsequent steps in the algorithm involve averaging and sorting operations. The column reordering step needs O(n log(n)) time using, for example, the quick-sort algorithm. The reordering of the rows of A can be performed in time O(tm log(m)). Computing the Fiedler vector includes the computation of the second largest left and right singular vectors of an m×n matrix Γ. The customer-product interaction data matrix employed in the experiments described herein is tall and thin, involving roughly ten thousand customers and only thirty four products. For such a tall and thin matrix Γ, a standard practice is to compute the Singular Value Decomposition of the matrix $\Gamma^T \Gamma$, which is an n×n matrix, and then to extract the singular values and vectors of Γ with some additional matrix operations.

In exemplary embodiments, the systems and methods described herein can visualize the re-ordered hierarchies in a "card deck" view. After the reordering of the sparse input matrix A, the costumers or the groups can be grouped (for every level of the hierarchy) and the re-orderings and the groupings can be visualized. In exemplary embodiments, a dendrogram-type construction grouping algorithm can be implemented. The reordering of the groups of customers is achieved by the time visualization of the re-ordering is commenced. In addition, representatives (i.e., the mean values of the appropriate elements of the Fiedler vector) for each group have been extracted for every level of the hierarchy. By utilizing the distances (e.g., absolute values) between the representatives, a dendrogram. Dendrogram construction commences by agglomerating the two most closed objects, replacing them with some surrogate object (e.g., their average value) and then continuing the process until only one (i.e., super) object remains. Dendrogram construction can have a complexity in the order of $O(N^2 \log(N))$, where N is the number of objects. In exemplary embodiments, the systems and methods described herein consider merging adjacent objects. Hence, all pairwise distances do not have to be computed, which is the major bottleneck in such an algorithm. Therefore, to partition the groups of the z-th level of H, for z=1:t, O(N) time is computed, where N is the number of groups of the current level of H.

Figure 13:
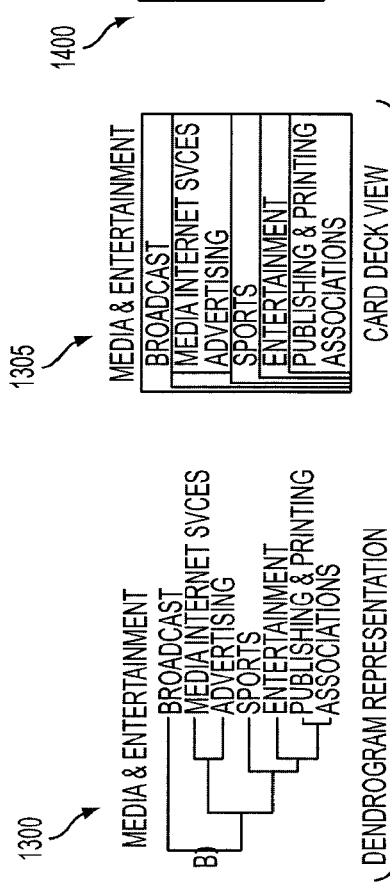
FIG. 13 illustrates another example of a card deck view in accordance with exemplary embodiments.

To visualize both the reordering and the clustering of the rows of A, a compacted view of the dendrogram is adopted implementing an exemplary visualization method called the "card deck view". In exemplary embodiments, any directly connected objects can be enclosed in a rectangle with color density d, regardless of the dendrogram height of the directly connected objects. The enclosure depicts groups of objects that share similarities. For the higher levels of the dendrogram, the objects are enclosed into bigger rectangles in the remaining groups, while increasingly subtracting $\epsilon$ from the rectangle color density d. FIGS. 6 and 7 illustrate examples of card deck views. FIG. 13 illustrates another example of a card deck view in accordance with exemplary embodiments, which presents a dendrogram 1300 of customer groups and a resulting card-deck-view representation 1305. In this example, the reordered sub-industries of the Industry "Media & Entertainment" are grouped.

EXAMPLES

In exemplary experiments, real customer-product interaction datasets derived within a company and spanning geographically are considered. Four different matrix reordering methods such that to pick the "best" of them for reordering the representatives of the exemplary algorithms are then selected. The performance of the algorithms is evaluated from a quantitative point of view by measuring the "compactness" of the reordered matrix. From a marketing analytics point of view, the meaningfulness of the re-orderings are evaluated on the hierarchy itself and the results derived are visualized by the algorithms with the card deck view technique. The visualization of the results is performed through a graphical for reordering matrices with hierarchical constraints. The experiments indicate that the exemplary algorithms, such as the algorithm described in method 1200 of FIG. 12, can produce almost as "compact" re-orderings as those that arise from the standard methods, while at the same time providing results that allow the exploration of the market in all different levels of the pre-existing hierarchy.

The data in the experiments included the buying activity of 10134 customers on 34 products, and spanned a single country. This dataset is modeled as a sparse binary 10134×34 matrix A. The (i, j)-th element of A is non-zero if and only if the i-th customer has bought the j-th product. The rows of this matrix, (i.e. the customers), preserve a two-level hierarchical structure H. In the first level of the hierarchy all the customers are categorized into 22 different groups in terms of the market industry they belong to, like for example "Banks", "Health", "Education", etc. An identifier is given to each customer for this industry level and it is referred to as Industry IMG. In the second level, each of the 22 different industry IMGs is categorized to (up to) eleven different sub-industries. For example, the Industry IMG "Education" is further divided into the sub-industries "Secondary Education" and "Higher Education". The second industry level identifier is referred to as Industry IMS. Thus, every customer can be characterized by a pair of ids, the IMG and the IMS, indicating the market industry and sub-industry he belongs to. The sparsity pattern of this matrix A is depicted in FIG. 5. Every element of the matrix corresponds to a pixel of FIG. 5, which has an appropriate rectangular shape such that the non-zero pattern of the whole matrix (i.e., this matrix is tall and thin) can be visualized with a square black and white figure.

In the examples, a numerical evaluation of four standard matrix reordering algorithms applied to sparse matrices without hierarchies are implemented to choose a method for reordering the representatives of the exemplary algorithm as described herein. In the first algorithm, the Fiedler vector is implemented for sorting. As described herein, given the m×n matrix A, the m-dimensional vector $u_2$ corresponding to the rows of A and the n-dimensional vector $v_2$ corresponding to the columns of A are computed. The vectors are then sorted in order to obtain the actual row and column re-orderings, respectively. In the second algorithm in the example, the Fiedler vector is implemented to complete linkage. Instead of sorting the values of $u_2$ and $v_2$ via a standard sorting algorithm, the complete linkage rearranging technique is employed. In a third algorithm, in the example, actual data is implemented to complete linkage. The complete linkage method is applied on the actual points (rows and columns) of the input matrix A. In a fourth algorithm approximate minimum degree (AMD), as known in the art, is implemented.

Figure 14:
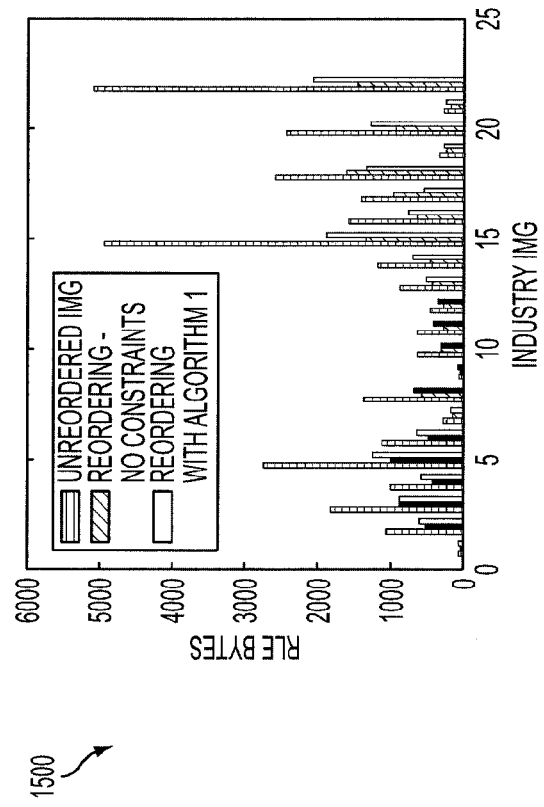
FIG. 14 illustrates a compactness table in accordance with exemplary embodiments.

The four example algorithms are run on three different datasets, which are subsets of the data set in the example. Three different matrices A1, A2, and A3, containing 241, 236, and 276 customers, respectively, are constructed. The three matrices correspond to the customers of three different sales people (i.e., every sales person is responsible for a subset of the customers and makes products recommendations only to his/her customers). All three matrices include 34 columns corresponding to the products of the data. The "compactness" of these matrices after the application of the four different reordering methods is shown in FIG. 14, which illustrates an example of a compactness table 1400. The "compactness" C of A1, A2, and A3 before the application of any reordering algorithm is 882, 702, and 664 bytes, respectively. For all three datasets, the method resulting to the "best" reordering is the third one of FIG. 14, which corresponds to the application of the complete linkage rearranging algorithm on the actual points (rows and columns) of the input matrix. In contrast, complete linkage on high dimensional vectors is expensive and impractical for real applications. The second "best" reordering method is sorting the Fiedler values of the computed vector of the input matrix. Since this technique is relatively fast in practice running in roughly 4-5 seconds—as opposed to about one minute—on the data of the basic reordering routine of the exemplary re-ordering algorithm. An additional advantage of the Fiedler vector approach is the fact that it allows for a straightforward generalization for reordering groups of vectors since taking averages of the Fiedler values and sorting them corresponds to the objective of sorting groups of real numbers.

The exemplary algorithms described herein are applied on the data matrix A described herein, resulting in the compactness C (i.e., RLE bytes) for three different situations. First, given the matrix A, only the rows of A are re-ordered such that to have customers of the same Industry IMG and IMS close to each other; the reordering of the customers within an IMS and the reordering of the IMSs and the IMGs is selected randomly. This case is referred to as the "Unreordered" case, and corresponds to an alphabetical reordering. Second, a reordering of the matrix A is computed by reordering rows determined by sorting the values of the first m elements of the Fiedler vector once. This second case can be referred to as "Reordering—no constraints". Third, a reordered matrix is constructed by employing the exemplary algorithms, thus taking into consideration the pre-existing hierarchical constraints. This case is referred as "Reordering with the exemplary algorithm". The RLE bytes for these three different re-orderings are 33238, 6378, and 15254 bytes, respectively.

Figure 15:
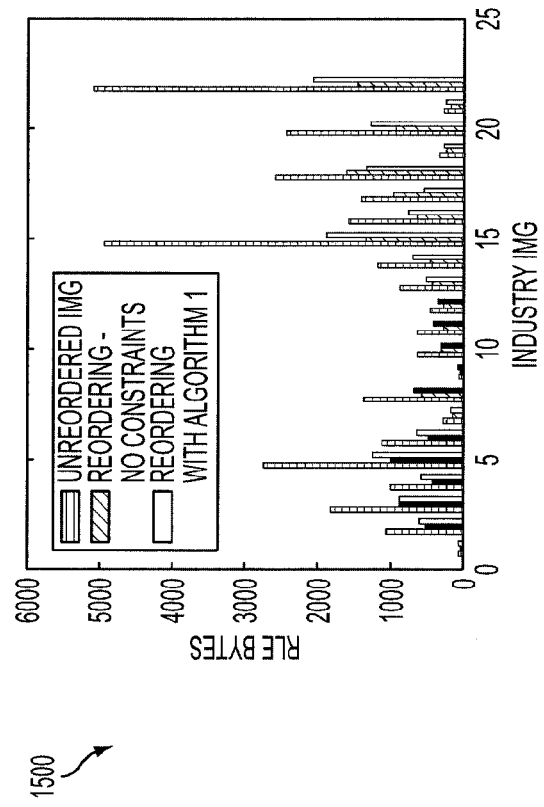
FIG. 15 illustrates a plot of RLE bytes versus IMG.
Figure 16:
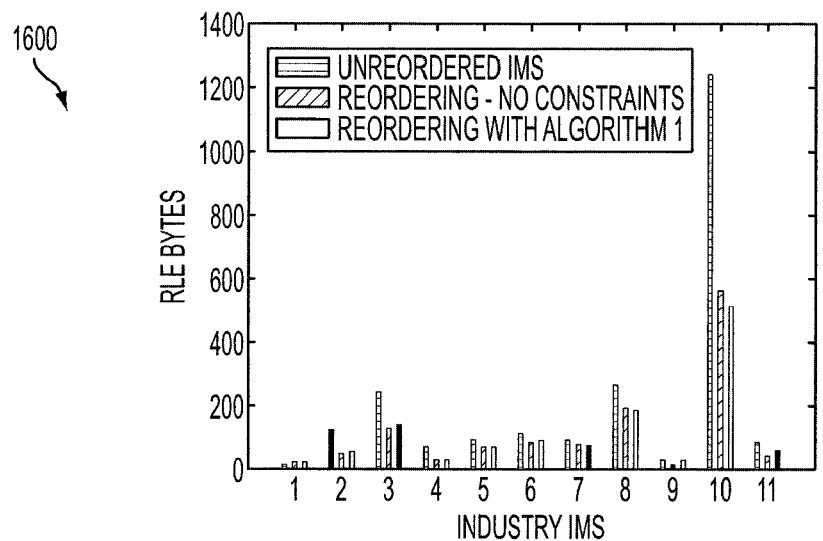
FIG. 16 illustrates a plot of RLE bytes versus IMS.

The "Reordering—no constraints" method achieves a better compression ratio than the exemplary algorithm since the hierarchical constraints are not taken into consideration. The compactness C achieved by the exemplary algorithm is better than the compactness derived with the "Unreordered" case, thus indicating that the hierarchical constraints can't prevent the method of achieving "compact" matrix representations. Though that the compactness of the "Un-reordering—no constraints is worse than the compactness value of the "Reordering—no constraints" case, which can be considered the penalty of incorporating constraints in the reordering process. Finally, the RLE bytes for the above three methods in the Industry IMG Level are illustrated in FIG. 15, showing a plot 1500 of RLE bytes versus IMG. The RLE bytes for each row sub-matrix correspond to one of the 22 different Industry IMGs. In addition, FIG. 16 illustrates a plot 1600 showing the RLE results for the Industry IMS level. In all cases, the compactness C achieved by the exemplary algorithm is better than that of the unreordered case and slightly worse than the "Reordering—no constraints" case. The latter observation indicates that the penalty of incorporating constrains does not reduce much the quality of a reordering method.

Figure 17:
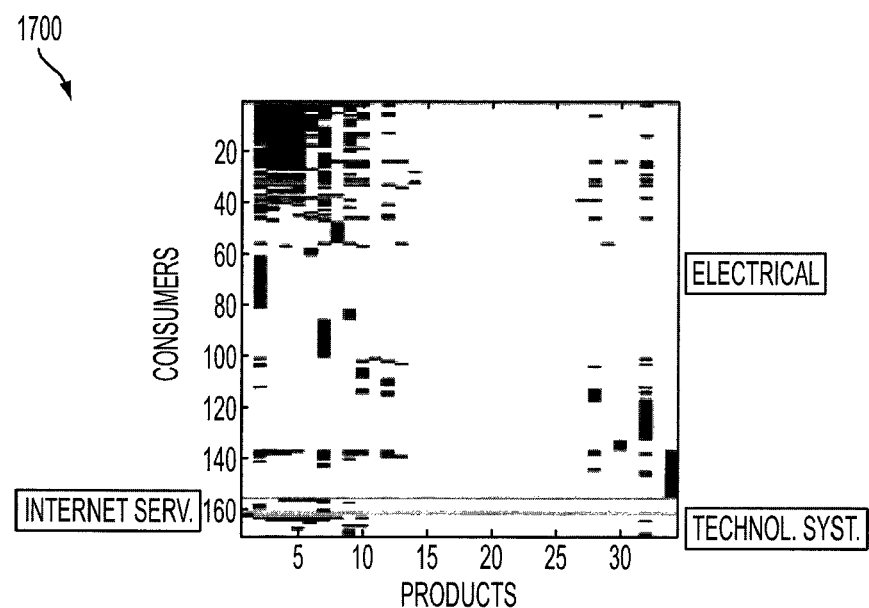
FIG. 17 illustrates an example of a non-zero pattern plot of customers versus products.

In the example, the outcome of the exemplary algorithm includes a reordering of the 22 IMGs, a reordering of the IMSs of every IMG, and a reordering of the customers within every IMS. IMG implies the group of customers (i.e., row sub-matrix in A) belongs to this IMG (similarly for IMS). The dendrogram and the "card deck view" clustering and visualization methods are implemented to cluster and visualize the reordered hierarchies as well as individual customers. FIG. 7 illustrates the results of the process described herein. The GUI 700 illustrates three views. The card-deck-view 705 of the hierarchy (i.e., IMG level for FIG. 7), enables the user (e.g., a sales or marketing person) to select any portion at any level of the hierarchy. For any selected branch (or group of branches) on the hierarchy the resulting customer-product matrix 710 is depicted. The user can either select individual rows and columns, or visually select groups of the matrix. Automatically, other selected customers and products are illustrated in the text-view window 715. This example argues that the incorporation of hierarchies in the reordering process allows an exploration of the market in all levels of the pre-existing hierarchy. FIG. 6 illustrates the re-orderings achieved by the exemplary, for all 22 IMGs, for the IMSs of two IMGs, and for the customers of an IMS of the previous IMSs. The outcome of the exemplary algorithm, for all levels of the hierarchy, includes a meaningful ordering of the industries of the market. For example, in the first level, "Travel and Transport" is close to "Automotive", and "Financial Markets" is close to "Banks". One level further, "Travel Transportation Internet" is close to "Passenger Airlines", and finally the reordering of the customers of the IMS "Travel Transportation Internet" easily allows for the identification of dense co-clusters. Finally, FIG. 17 illustrates a plot 1700 of customers versus products showing the non-zero pattern of the industry "Electronics"; within this industry, customers belonging to different subindustries, buy different groups of products. This example argues that the incorporation of hierarchies naturally guides the reordering process, since customers of the same subindustries (i.e., within an industry) share similar buying patterns.

Figure 18:
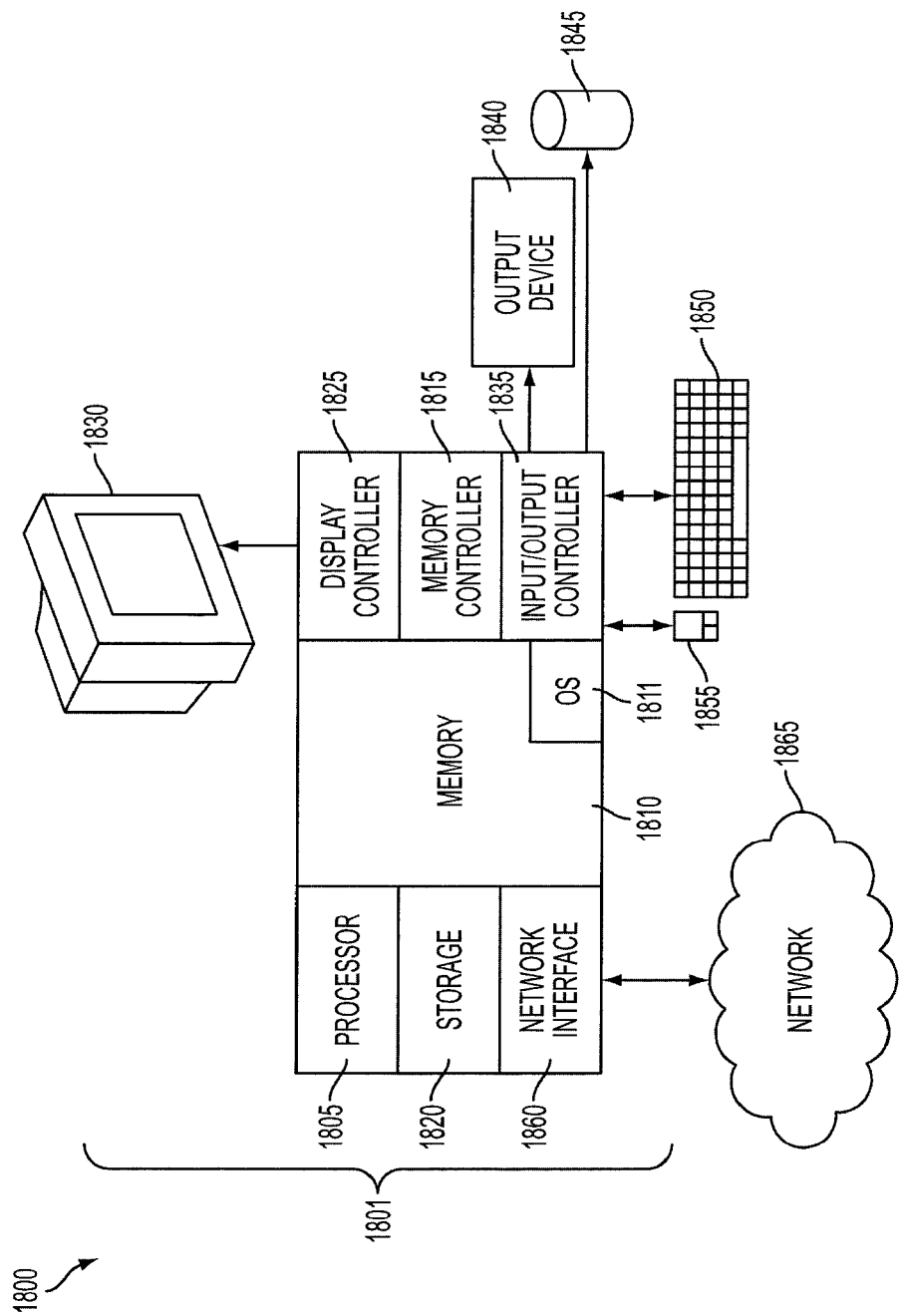
FIG. 18 illustrates an exemplary embodiment of a system for matrix reordering and visualization in the presence of data hierarchies.

The exemplary methods described herein can be implemented in a computer system in which the data related to the hierarchies and matrices is processed. FIG. 18 illustrates an exemplary embodiment of a system 1800 for matrix reordering and visualization in the presence of data hierarchies. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 1800 therefore includes general-purpose computer 1801.

In exemplary embodiments, in terms of hardware architecture, as shown in FIG. 18, the computer 1801 includes a processor 1805, memory 1810 coupled to a memory controller 1815, and one or more input and/or output (I/O) devices 1840, 1845 (or peripherals) that are communicatively coupled via a local input/output controller 1835. The input/output controller 1835 can be, but is not limited to, one or more buses or other wired or wireless connections, as is known in the art. The input/output controller 1835 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1805 is a hardware device for executing software, particularly that stored in memory 1810. The processor 1805 can be any custom made or commercially available processor, a central processing unit (CPU), an auxiliary processor among several processors associated with the computer 1801, a semiconductor based microprocessor (in the form of a microchip or chip set), a macroprocessor, or generally any device for executing software instructions.

The memory 1810 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1810 may incorporate electronic, magnetic, optical, and/or other types of storage media. The memory 1810 can have a distributed architecture, where various components are situated remote from one another, but can be accessed by the processor 1805.

The software in memory 1810 may include one or more separate programs, each of which comprises an ordered listing of executable instructions for implementing logical functions. In the example of FIG. 18, the software in the memory 1810 includes the reordering and visualization methods described herein in accordance with exemplary embodiments and a suitable operating system (OS) 1811. The operating system 1811 essentially controls the execution of other computer programs, such the reordering and visualization systems and methods as described herein, and provides scheduling, input-output control, file and data management, memory management, and communication control and related services.

The reordering and visualization methods described herein may be in the form of a source program, executable program (object code), script, or any other entity comprising a set of instructions to be performed. When a source program, then the program needs to be translated via a compiler, assembler, interpreter, or the like, which may or may not be included within the memory 1810, so as to operate properly in connection with the OS 1811. Furthermore, the reordering and visualization methods can be written as an object oriented programming language, which has classes of data and methods, or a procedure programming language, which has routines, subroutines, and/or functions.

In exemplary embodiments, a conventional keyboard 1850 and mouse 1855 can be coupled to the input/output controller 1835. Other output devices such as the I/O devices 1840, 1845 may include input devices, for example but not limited to a printer, a scanner, microphone, and the like. Finally, the I/O devices 1840, 1845 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 1800 can further include a display controller 1825 coupled to a display 1830. In exemplary embodiments, the system 1800 can further include a network interface 1860 for coupling to a network 1865. The network 1865 can be an IP-based network for communication between the computer 1801 and any external server, client and the like via a broadband connection. The network 1865 transmits and receives data between the computer 1801 and external systems. In exemplary embodiments, network 1865 can be a managed IP network administered by a service provider. The network 1865 may be implemented in a wireless fashion, e.g., using wireless protocols and technologies, such as WiFi, WiMax, etc. The network 1865 can also be a packet-switched network such as a local area network, wide area network, metropolitan area network, Internet network, or other similar type of network environment. The network 1865 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 1801 is a PC, workstation, intelligent device or the like, the software in the memory 1810 may further include a basic input output system (BIOS) (omitted for simplicity). The BIOS is a set of essential software routines that initialize and test hardware at startup, start the OS 1811, and support the transfer of data among the hardware devices. The BIOS is stored in ROM so that the BIOS can be executed when the computer 1801 is activated.

When the computer 1801 is in operation, the processor 1805 is configured to execute software stored within the memory 1810, to communicate data to and from the memory 1810, and to generally control operations of the computer 1801 pursuant to the software. The reordering and visualization methods described herein and the OS 1811, in whole or in part, but typically the latter, are read by the processor 1805, perhaps buffered within the processor 1805, and then executed.

When the systems and methods described herein are implemented in software, as is shown in FIG. 18, the methods can be stored on any computer readable medium, such as storage 1820, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the reordering and visualization methods are implemented in hardware, the reordering and visualization methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include very fast reordering; implementation of preexisting hierarchies; data reordering that obeys hierarchy constraints (i.e., more meaningful reordering); easier data exploration through use of hierarchies; and interactive data exploration and knowledge discovery.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for re-ordering and visualizing a matrix in the presence of a data hierarchy stored on a computer system, the method comprising:
    receiving, in the computer system, a matrix having a plurality of sub-matrices and having rows and columns;
    identifying a plurality of data hierarchies that correspond to the plurality of sub-matrices;
    identifying hierarchical constraints from the plurality of data hierarchies;
    generating a bipartite graph for the matrix;
    computing an adjacency matrix for the matrix;
    computing a Laplacian matrix from the adjacency matrix;
    computing a Fielder vector from the Laplacian matrix;
    reordering the columns of the matrix;
    reordering the rows of the matrix;
    reordering the data hierarchy on the columns of the matrix; and
    reordering the data hierarchy on the rows of the matrix,
    wherein the matrix, the plurality of sub-matrices and the identified plurality of data hierarchies are reordered so that groups of related rows and columns are brought in adjacent matrix positions, wherein reordering the matrix, the plurality of sub-matrices and the identified plurality of data hierarchies, obeys the identified constraints imposed by the data hierarchy on at least one of the rows and the columns,
    wherein affinities in the data hierarchy are extracted by the reordering of the data hierarchy.

2. The method as claimed in claim 1 wherein the matrix includes a hierarchy structure.

3. The method as claimed in claim 2 further comprising extracting representatives for the plurality of sub-matrices of the rows of the matrix.

4. The method as claimed in claim 1 wherein reordering the columns of the matrix comprises sorting the last n elements of the Fielder vector.

5. The method as claimed in claim 2 wherein reordering the rows of the matrix comprises reordering a current level of the hierarchy.

6. The method as claimed in claim 5 further comprising sorting mean values of elements of the Fielder vector that correspond to rows of a group belonging to the current level of the hierarchy.

7. A computer program product for re-ordering and visualizing a matrix in the presence of data hierarchies stored on a computer system, the computer program product including a non-transitory computer readable medium having instructions for causing the computer system to implement a method, the method comprising:
receiving, in the computer system, a matrix having a plurality of sub-matrices and having rows and columns;
identifying a plurality of data hierarchies that correspond to the plurality of sub-matrices;
identifying hierarchical constraints from the plurality of data hierarchies;
generating a bipartite graph for the matrix;
computing an adjacency matrix for the matrix;
computing a Laplacian matrix from the adjacency matrix;
computing a Fielder vector from the Laplacian matrix;
reordering the columns of the matrix;
reordering the rows of the matrix;
reordering the data hierarchy on the columns of the matrix; and
reordering the data hierarchy on the rows of the matrix,
wherein the matrix, the plurality of sub-matrices and the identified plurality of data hierarchies are reordered while obeying the identified constraints of the data hierarchy.

8. The computer program product as claimed in claim 7 wherein the matrix includes a hierarchy structure.

9. The computer program product as claimed in claim 7 further comprising extracting representatives for the plurality of sub-matrices of the rows of the matrix.

10. The computer program product as claimed in claim 7 wherein reordering the columns of the matrix comprises sorting the last n elements of the Fielder vector.

11. The computer program product as claimed in claim 8 wherein reordering the rows of the matrix comprises reordering a current level of the hierarchy.

12. The computer program product as claimed in claim 11 further comprising sorting mean values of elements of the Fielder vector that correspond to rows of a group belonging to the current level of the hierarchy.

13. A method for re-ordering and visualizing a matrix in the presence of data hierarchies stored on a computer system, the method comprising:
receiving a first data set;
receiving a second data set;
identifying data hierarchies for the first and second data sets;
identifying hierarchical constraints from the identified data hierarchies;
generating a sparse matrix representing the first and second data sets; and
reordering the sparse matrix to reveal interactions between the first and second data sets to generate a re-ordered hierarchy, wherein the reordering obeys the identified constraints imposed by the data hierarchies, wherein the reordering comprises:
generating a bipartite graph for the sparse matrix;
computing an adjacency matrix for the sparse matrix;
computing a Laplacian matrix from the adjacency matrix;
computing a Fielder vector from the Laplacian matrix;
reordering the columns of the sparse matrix;
reordering the rows of the sparse matrix;
reordering the data hierarchy on the columns of the sparse matrix; and
reordering the data hierarchy on the rows of the sparse matrix.

14. The method as claimed in claim 13 further comprising generating a graphical user interface (GUI) to visualize the re-ordered hierarchy.

15. The method as claimed in claim 14 wherein the GUI includes a card-deck view of the re-ordered hierarchy.

16. The method as claimed in claim 15 wherein the card-deck view includes color densities that represent interconnections between interconnected data groups of the first and second data sets.

17. The method as claimed in claim 14 wherein the GUI includes a matrix view illustrating interconnected branches of the re-ordered hierarchy.

18. The method as claimed in claim 17 wherein the GUI includes a text view of the data of the interconnected branches of the re-ordered hierarchy.

19. A computer program product for re-ordering and visualizing a matrix in the presence of data hierarchies stored on a computer system, the computer program product including a non-transitory computer readable medium having instructions for causing the computer system to implement a method, the method comprising:
receiving a first data set;
receiving a second data set;
identifying data hierarchies for the first and second data sets;
identifying hierarchical constraints from the identified data hierarchies;
generating a sparse matrix representing the first and second data sets; and
reordering the sparse matrix to reveal interactions between the first and second data sets to generate a re-ordered hierarchy, wherein the reordering obeys the identified constraints imposed by the data hierarchies, wherein the reordering comprises:
generating a bipartite graph for the sparse matrix;
computing an adjacency matrix for the sparse matrix;
computing a Laplacian matrix from the adjacency matrix;
computing a Fielder vector from the Laplacian matrix;
reordering the columns of the sparse matrix;
reordering the rows of the sparse matrix;
reordering the data hierarchy on the columns of the sparse matrix; and
reordering the data hierarchy on the rows of the sparse matrix.

20. The computer program product as claimed in claim 19 further comprising generating a graphical user interface (GUI) to visualize the re-ordered hierarchy.

21. The computer program product as claimed in claim 20 wherein the GUI includes a card-deck view of the re-ordered hierarchy.

22. The computer program product as claimed in claim 21 wherein the card-deck view includes color densities that represent interconnections between interconnected data groups of the first and second data sets.

23. The computer program product as claimed in claim 20 wherein the GUI includes a matrix view illustrating interconnected branches of the re-ordered hierarchy.

24. The computer program product as claimed in claim 23 wherein the GUI includes a text view of the data of the interconnected branches of the re-ordered hierarchy.

* * * * *